United States Patent [19]

Sturrus et al.

[11] Patent Number: 5,080,427

[45] Date of Patent: Jan. 14, 1992

[54] IMPACT BEAM

[75] Inventors: Peter Sturrus; Leslie A. Lewis, both of Grand Haven; Roy Johnson, Coopersville, all of Mich.

[73] Assignee: Shape Corporation, Grand Haven, Mich.

[21] Appl. No.: 611,968

[22] Filed: Nov. 13, 1990

[51] Int. Cl.⁵ .................................. B60R 27/00
[52] U.S. Cl. .................................. 296/188; 296/146
[58] Field of Search ............. 296/188, 189, 146, 905; 52/720, 732

[56] References Cited

U.S. PATENT DOCUMENTS

| | | | |
|---|---|---|---|
| 1,570,310 | 1/1926 | Ljungberg et al. | 52/732 |
| 1,684,832 | 9/1928 | Jenkins . | |
| 1,757,694 | 5/1930 | Weichold | 52/720 X |
| 2,169,253 | 8/1939 | Kotrbaty | 52/720 X |
| 2,248,319 | 3/1939 | Waterhouse, Jr. | 296/28 |
| 2,349,907 | 7/1941 | Kos et al. | 189/46 |
| 2,597,837 | 5/1952 | Lindsay | 296/28 |
| 2,809,017 | 10/1957 | Wong | 52/732 X |
| 3,066,775 | 12/1962 | Valsvik | 52/720 |
| 3,444,664 | 5/1969 | Fink et al. | 52/732 |
| 3,883,171 | 5/1973 | Bauer | 296/28 R |
| 4,265,383 | 5/1981 | Ferguson | 52/718.1 X |
| 4,294,487 | 10/1981 | Nakamura | 296/188 |
| 4,469,368 | 9/1984 | Eger | 296/188 |
| 4,679,820 | 7/1987 | Srock et al. | 296/781 |
| 4,682,832 | 7/1987 | Hurten et al. | 296/195 |
| 4,684,166 | 8/1987 | Kanodia | 296/146 |
| 4,708,390 | 11/1987 | Palentyn et al. | 296/188 |
| 4,796,946 | 1/1989 | Wilson et al. | 296/146 |
| 4,838,606 | 6/1989 | Furubayashi et al. | 296/188 |
| 4,881,355 | 11/1989 | Bosl et al. | 52/732 X |
| 4,934,751 | 6/1990 | Shimoda | 296/188 |

FOREIGN PATENT DOCUMENTS

| | | |
|---|---|---|
| 812600 | 9/1951 | Fed. Rep. of Germany ........ 52/720 |
| 2750744 | 11/1977 | Fed. Rep. of Germany . |
| 0050813 | 8/1981 | Japan . |
| 0026171 | 4/1987 | Japan . |
| 619494 | 8/1945 | United Kingdom . |

Primary Examiner—Margaret A. Focarino
Assistant Examiner—Gary C. Hoge
Attorney, Agent, or Firm—Price, Heneveld, Cooper, DeWitt & Litton

[57] ABSTRACT

A roll-formed door beam is provided for a vehicle which has an elongated shaped including a hat shaped portion and one to two looping portions. The hat shaped portion includes an upper flat surface for attachment and downwardly extending sides. The looping portions includes a bottom flat surface for attachment and looping sides which loopingly extend backwardly toward the base of the hat shaped portion. The looping sides cooperate with the side of the hat portion to stabilize the beam during flexure thus increasing the strength to thickness ratio of the beam.

23 Claims, 2 Drawing Sheets

IMPACT BEAM

BACKGROUND OF THE INVENTION

This invention relates to a beam, and particularly to a high strength vehicle door impact beam having a minimum thickness and weight.

Automobiles and trucks continue to become smaller and more compact to minimize cost and maximize fuel efficiency. This reduction in size has placed a premium on interior space and weight, and has resulted in a demand for more compact components. One result of this downsizing of vehicles is a demand for thinner doors that maximize passenger compartment size while minimizing overall vehicle width and weight. However, use of thinner doors must be done with a view toward maintaining the overall safety of the vehicle and, in particular in regard to doors, the vehicular crash-worthiness from side impacts. Thus, improvements in door strength, thinness, cost, ease of manufacture, and reduction in weight are all desirable.

SUMMARY OF THE INVENTION

The present invention is directed to an elongated beam which has a hat shaped portion centrally located between two looping portions. The hat shaped portion includes an upper flat wall section and downwardly extending side sections. Each looping portion includes a bottom flat section integrally connected to the downwardly extending side sections and a looping side section which loopingly extends backwardly toward the hat shaped portion. The looping side includes a segment located adjacent the downwardly extending side of the hat shaped portion for cooperatively stabilizing the hat shaped portion during flexure of the beam. This results in increased bending strength and energy absorption during bending and a reduced tendency to experience sudden collapse.

Such a beam provides a compact load bearing beam having a high bending strength to thickness ratio for mounting within a vehicle door, thus helping to maintain vehicular side-impact crash worthiness while minimizing door thickness and weight. These and other features, objects and advantages of the present invention will become apparent upon reading the following description thereof together with reference to the accompanying drawings in which:

DETAILED DESCRIPTION OF THE PREFERRED EMBODIMENTS

Figure 1:
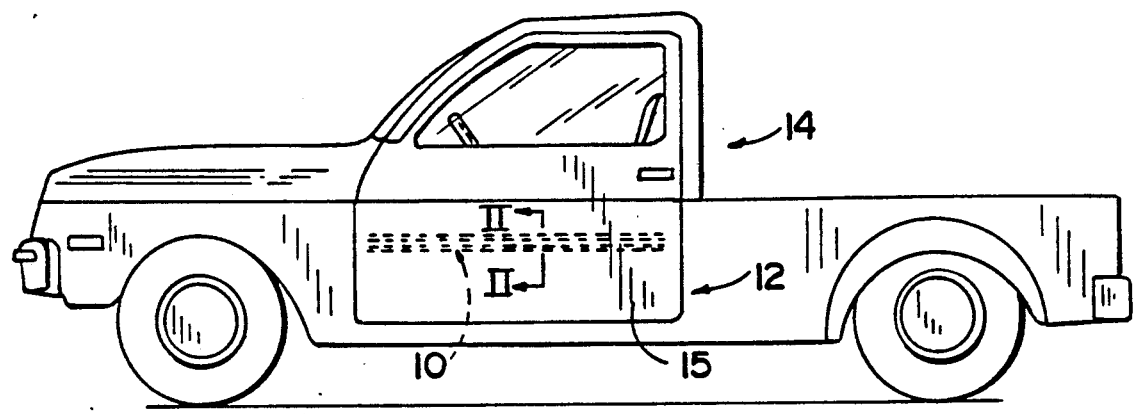
FIG. 1 is a side elevational view of a vehicle with the beam embodying the invention installed therein.
Figure 2:
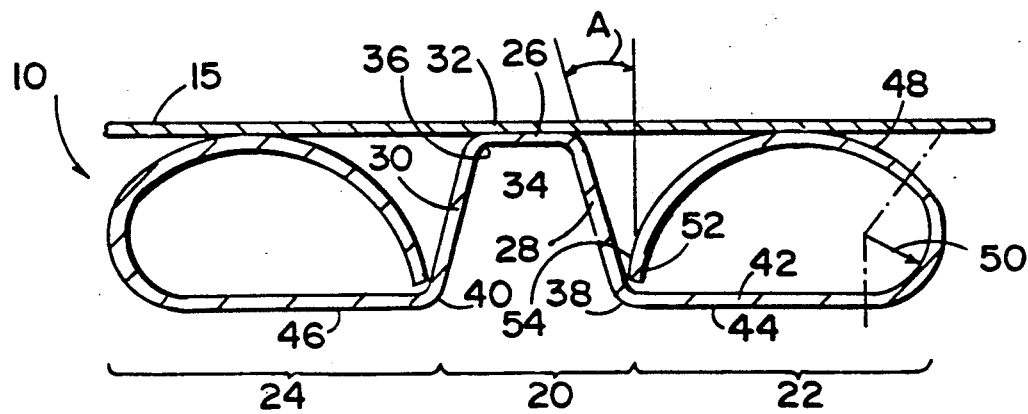
FIG. 2 is a cross-sectional view of the beam taken along the plane II—II of FIG. 1.

Referring initially to FIGS. 1 and 2 there is shown a beam 10 embodying the present invention and which is particularly adapted for mounting within door assembly 12 on vehicle 14. In the preferred embodiment, beam 10 is designed to fit horizontally within door assembly 12 to provide structural support for door assembly 12 and also to provide sidewardly impact strength for passenger safety during vehicular side impact crashes and accidents. In some embodiments, the end structure of beam 10 is modified to provide an attachment means on either end.

Beam 10 is shown in FIG. 2 as rotated 90° from the cross-section as taken thru lines II—II in FIG. 1 to facilitate description. Beam 10 is a symmetrically shaped, roll-formed beam made from a single sheet of a high strength sheet metal. Beam 10 has a centrally located hat portion 20 and two opposing looping portions 22 and 24. Looping portions 22 and 24 are mirror images of each other and are integrally connected to hat portion 20 as described below. Hat portion 20 includes an upper flat wall section 26 and two opposing downwardly extending sides 28 and 30. Upper flat wall section 26 faces outwardly as beam 10 is installed in vehicle door 12 and includes an upper flat surface 32 which provides a surface conducive for attachment such as fasteners or by adhesive to the door wall 15. As positioned in FIG. 2, sides 28 and 30 extend downwardly and outwardly slightly at an angle A of approximately 15° from vertical. Sides 28 and 30 are connected to wall section 26 at corners 34 and 36 with corners 34 and 36 being radiused slightly to facilitate manufacture by roll forming. At the bottom of sides 28 and 30 are base corners 38 and 40 to which looping portions 22 and 24 are integrally attached as discussed below.

Looping portions 22 and 24 are mirror images of each other such that only looping portion 22 need be described below. Looping portion 22 integrally connects with base corner 38 and extends laterally as shown in FIG. 2 forming flat bottom section 42. Bottom section 42 faces inwardly as beam 10 is installed in vehicle door 12 and includes a flat bottom surface 44 which is substantially aligned in the same plane as corresponding flat bottom surface 46 of looping portion 24. Both surfaces 44 and 46 provide a means (not shown) for attachment such as by fasteners or by adhesive to door assembly 12. Looping portion 22 includes a looping side section 48 which extends from flat bottom section 42 upwardly and backwardly toward base 38. Looping side 48 extends initially in a circular path as indicated by radius 50 and then in a broader curvilinear manner extends the remaining length toward base corner 38. Edge 52 of looping side 48 terminates just short of base corner 38 so that it is located adjacent to side 22 and near base corner 38. In the preferred embodiment, the uppermost surface of looping side 48 lies in substantially the same plane as upper flat surface 32 of hat portion 20. Also in the preferred embodiments, looping side section 48 defines with side 28 a V shaped valley 54, the bottom of the valley 54 being near to base corner 38. Looping side section 46 and 48 are strategically oriented with respect to sides 28 and 30 so as to extend toward side sections 28 and 30, respectively. This orientation acts to stabilize sides 28, 30 as bending forces are exerted against the hat portion and looping portions 22, 24. Thus, hat portion 20 and looping portions 22 and 24 not only act independently to increase initial strength, but also act cooperatively and dynamically to stabilize each other during bending, thus increasing the total strength and total energy absorbed over the force/deflection curve by preventing uncontrolled buckling of the downwardly extending side sections 28, 30. Restated, portions 20, 22 and 24 interact to improve the force/deflection curve by stabilizing each other. This stabilizing effect is greatest when beam 10 is oriented so that the bending force is exerted on the top of the beam 10 as shown in FIG. 2.

It is contemplated that the invention may be made in a variety of ways and from a variety of materials. However, the preferred embodiment shown was roll-formed from a single sheet of high strength steel having a tensile strength of about 80 to 140 KSI and a minimum thickness of about 0.060 inches. Also, in the preferred embodiment, the thickness and width were about 1 inch and 4.6 inches, respectively. Experimental testing of a prototype door beam made as noted generated a surprisingly high amount of bending resistance and, importantly, did not exhibit sudden failure as is often experienced by beams as supporting webs of a beam collapse or spread. Testing has shown that welding edges 52 of looping portions 22, 24 to downwardly extending side sections 28, 30 does not improve the force/deflection curves either in peak force of resistance or in total energy absorbed. Further, efforts to improve this cross-section by finite element analysis were unsuccessful. In other words, finite element analysis has substantiated the unique properties of this cross-sectional design.

Figure 1A:
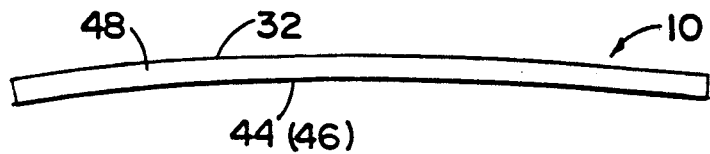
FIG. 1A is a plan view of the beam.

It is contemplated that beam 10 (FIG. 1A) may be given a sweep or curve along its longitudinal length in order to match the contour of door assembly 12. Such a sweep is contemplated to be a gentle sweep and may be accomplished by bending methods commonly known in the art as a sweeping operation.

Figure 3:
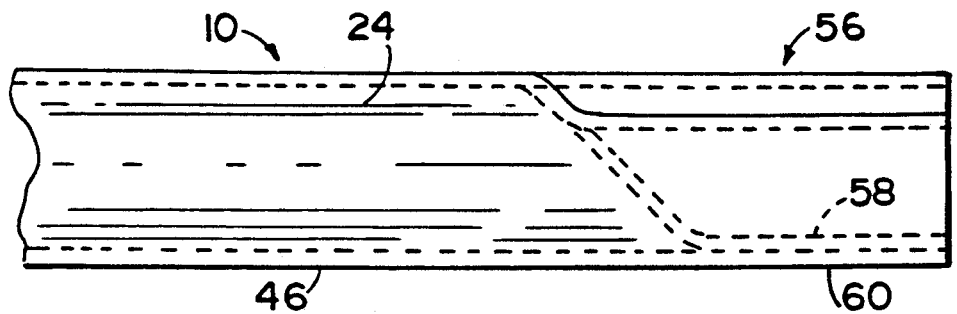
FIG. 3 is a side elevational view of a second embodiment.
Figure 4:
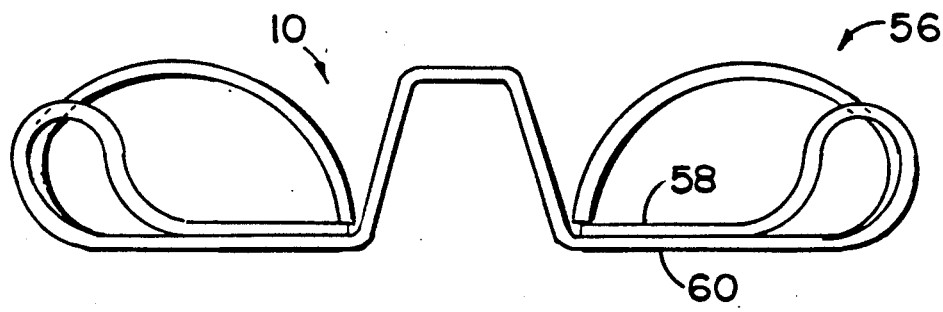
FIG. 4 is an end view of the beam of FIG. 3.
Figure 5:
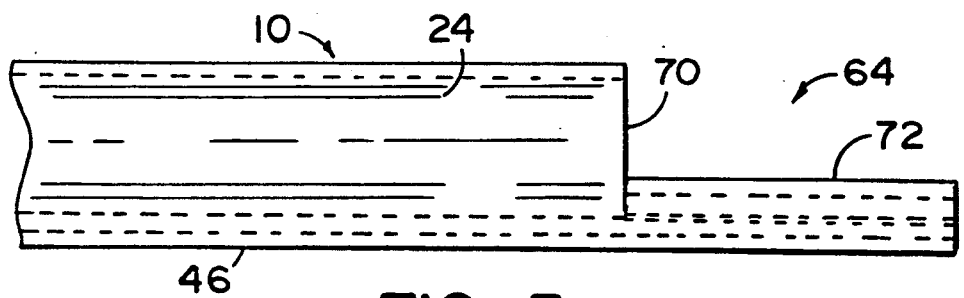
FIG. 5 is a side elevational view of a third embodiment.
Figure 6:
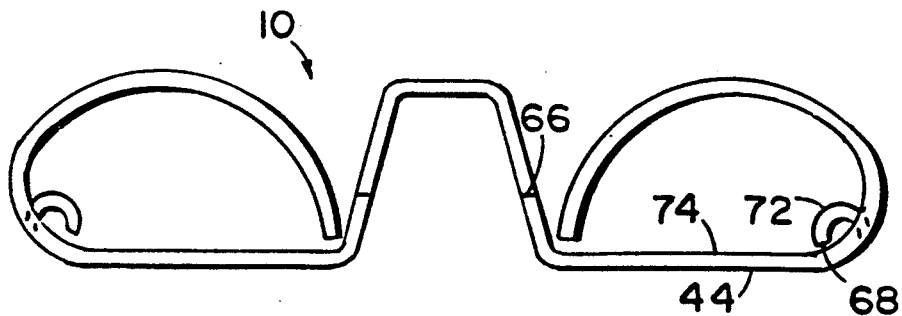
FIG. 6 is an end view of the beam of FIG. 5.

A second embodiment shown in FIG. 3 further includes an end treatment 56 which provides a surface 58 and 60 for secure attachment of beam 10 within door assembly 12 (FIGS. 3-4). End treatment 56 is formed by pressing or crushing a portion of looping side sections 48, 50 against flat bottom section 42. As most clearly illustrated in FIG. 4, a portion of looping side section 48 is displaced to a position located against flat bottom section 42 during the formation of end treatment 56, thus providing substantially flat and parallel attachment surfaces 58 and 60. Various attachment means such as fasteners and the like commonly known in the art can thus be securely and consistently located on attachment surfaces 58, 60 such as by welding, adhesives, holes and fasteners, or the like.

A third embodiment includes a second end treatment 64 which is manufactured by cutting away a portion of hat portion 20 and reforming looping portions 22 and 24. The cutting can be achieved by methods commonly known in the art, such as use of a pre-notch, secondary notch or similar methods. In end treatment 64, approximately the upper half of the cross-section of beam 10 is cut away to form edges 66, 68 and 70. A subsequent pressing operation then reforms the newly formed edge 68 into a tight looping side 72. Thus, the upper surface of flat bottom section 42 is exposed and provides a flat upper surface 74 and a flat bottom surface 44 for attachment.

Thus, it is seen with the beam of the present invention, a compact and high strength beam having a minimum thickness provided for use in a thinner door assembly while maintaining proper structural strength for the safety of passengers within the vehicle. In preferred embodiments of the invention, the beam cross-section is designed such that outer looping portions stabilize the central hat portion thus providing an increased initial strength and an improved energy absorption during flexure. Further embodiments offer end treatments which provide for more reliable and consistent attachment within a door assembly. It will become apparent to those skilled in the art that various modifications to the preferred embodiment of the invention can be made without departing from the spirit and scope thereof as defined by the appended claims.

The embodiments of the invention in which an exclusive property or privilege is claimed are defined as follows:

1. An elongated beam having two sides for mounting between two panels of a vehicle comprising:
   said beam having a hat shaped portion centrally located between two looping portions;
   said hat shaped portion including an upper substantially flat wall section at one side of said beam and two leg sections extending toward said other side of said beam; and
   each of said looping portions including a flat section integrally connected to one of said leg sections at said other side of said beam and laterally extending from said hat shaped portion, and further including a looping section which loopingly extends toward said one side of said beam and then backwardly toward said hat shaped portion, said looping sections including a segment located adjacent the juncture of said leg sections of said hat shaped portion and the said flat section of said looping portions for cooperatively stabilizing said hat shaped portion during flexure of said beam thereby providing increased bending strength of said beam.

2. The article of claim 1 wherein said segments of said looping sections for cooperatively stabilizing said hat shaped portion include edges that are located near that portion of said leg portion adjacent said other side of said beam.

3. The article of claim 1 wherein said looping portions are mirror images of each other.

4. The article of claim 1 wherein said looping portions have an oblong cross-sectional shape.

5. The article of claim 1 wherein said leg sections of said hat shaped portion diverge from each other and are oriented about 15° from vertical; wherein said looping portion includes a segment positioned near the end of one of said leg sections adjacent the other side of said beam to form a "V" shaped valley with said one leg section whereby said looping portions provide a spring-like action for cooperatively stabilizing said hat shaped portion during flexure of said beam for increased bending strength.

6. An elongated beam having two sides for mounting between two panels of a vehicle comprising:
   said beam having a hat shaped portion centrally located between two looping portions;
   said hat shaped portion including an upper flat wall section at one side of said beam and two leg sections extending toward said other side of said beam;
   each of said looping portions including a flat section integrally connected to one of said leg sections at said other side of said beam and laterally extending from hat shaped portion, and further including a looping section which loopingly extends toward said one side of said beam and then backwardly toward said hat shaped portion, said looping sections including a segment located adjacent said leg sections of said hat shaped portion for cooperatingly stabilizing said hat shaped portion during flexure of said beam for increased bending strength;

said leg sections of said hat shaped portion diverging from each other and oriented about 15° from vertical; wherein said looping portion includes a segment positioned near the end of one of said leg sections adjacent the other side of said beam to form a "V" shaped valley with said one leg section whereby said looping portions provide a spring-like action for cooperatively stabilizing said hat shaped portion during flexure of said beam for increased bending strength; and each of said looping sections having an end located adjacent that portion of said leg section which is connected to said bottom flat section of said looping portion.

7. The article of claim 1 wherein said beam is made of a single sheet of high strength steel.

8. The article of claim 7 wherein said high strength steel is at least 80 KSI and a minimum of 0.060 inches thick.

9. The article of claim 1 wherein said beam is roll formed.

10. The article of claim 1 wherein said beam has two ends along the longitudinal length of said beam, said ends including attachment means.

11. An elongated beam having two sides for mounting between two panels of a vehicle comprising:

said beam having a hat shaped portion centrally located between two looping portions;

said hat shaped portion including an upper flat wall section at one side of said beam and two leg sections extending toward said other side of said beam;

each of said looping portions including a flat section integrally connected to one of said leg sections at said other side of said beam and laterally extending from hat shaped portion, and further including a looping section which loopingly extends toward said one side of said beam and then backwardly toward said hat shaped portion, said looping sections including a segment located adjacent said leg sections of said hat shaped portion for cooperatingly stabilizing said hat shaped portion during flexure of said beam for increased bending strength;

said beam having two ends along the longitudinal length of said beam, said ends including attachment means; and said attachment means on said ends including at least one crushed portion of said looping section wherein a part of said looping section is crushed flat against said flat section of said looping portion thus providing a substantially flat attachment surface.

12. An elongated beam having two sides for mounting between two panels of a vehicle comprising:

said beam having a hat shaped portion centrally located between two looping portions;

said hat shaped portion including an upper flat wall section at one side of said beam and two leg sections extending toward said other side of said beam;

each of said looping portions including a looping section integrally connected to one of said leg sections at said other side of said beam and laterally extending from hat shaped portion, and further including a looping section which loopingly extends toward said one side of said beam and then backwardly toward said hat shaped portion, said looping sections including a segment located adjacent said leg sections of said hat shaped portion for cooperatingly stabilizing said hat shaped portion during flexure of said beam for increased bending strength;

said beam having two ends along the longitudinal length of said beam, said ends including attachment means; and said attachment means on said ends having at least one cutaway portion on said looping section exposing a surface on said flat segment of said looping portion thus providing a substantially flat attachment surface.

13. The article of claim 1 wherein said beam has a sweeping curvature along the longitudinal length of said beam for matching said beam with the contour of the door of a vehicle.

14. An elongated impact beam for reinforcing a structural member and absorbing energy created by dynamic forces impacting on said structural member comprising:

said beam having two sides with a hat shaped portion extending between said sides and along at least a major portion of the length of said beam with a reversely bent portion extending laterally from and located on each lateral side of said hat shaped portion;

said hat shaped portion having a top section located at one side of said beam and legs extending from said top section to the other side to form the hat shape;

said reversely bent portions each having a first section extending from one of said legs along said other side of said beam, and a second section extending from said first section toward said one side of said beam and then extending back at an angle toward said hat shaped portion and toward said other side of said beam so that each of the reversely bent portions extend toward and terminates adjacent a respective one of said legs of the hat shaped portion to cooperatively stabilize and reinforce the same when dynamic forces are impacted on the one side of said beam.

15. The beam of claim 14 in which the reversely bent portion is a loop, a portion of which is curvilinear, and which includes an edge that extends toward and terminates adjacent the juncture between one of said legs and said first section.

16. The impact beam of claim 14 in which each of said second sections of each of said reversely bent portions extend substantially the entire distance from said other side of said beam to said one side.

17. An elongated impact beam for reinforcing a structural member and absorbing energy created by dynamic forces impacting on said structural member comprising:

said beam having two sides with a hat shaped portion extending between said sides and along at least a major portion of the length of said beam with a reversely bent portion extending laterally from and located on each side of said hat shaped portion;

said hat shaped portion having a top section located at one side of said beam and legs extending from said top section to the other side to form the hat shape;

said reversely bent portions each having a first section extending from one of said legs along the said other side of said beam and a second section extending from said first section toward said one side of said beam and then extending back at an angle toward said hat shaped portion and toward said other side of said beam so that the reversely bent portions and the hat shaped portion cooperatively stabilize and reinforce each other when dynamic forces are impacted on the one side of said beam; and said second section of said reversely bent portion extending toward the juncture between one of said legs and said first section.

18. An elongated impact beam for reinforcing a structural member and absorbing energy created by dynamic forces impacting on said structural member comprising:

said beam having two sides with a hat shaped portion extending between said sides along at least a major portion of the length of said beam with a reversely bent portion extending laterally from and located on each side of said hat shaped portion;

said hat shaped portion having a top section located at one side of said beam and legs extending from said top section to the other side to form the hat shape, said legs diverging from each other; and said reversely bent portions each having a first section extending from one of said legs along the said other side of said beam and a second section extending from said first section toward said one side of said beam and then extending back at an angle toward said hat shaped portion and toward said other side of said beam, said reversely bent portion being a loop, a portion of which is curvilinear, whereby the reversely bent portions and the hat shaped portions cooperatively stabilize and reinforce each other when dynamic forces are impacted on the one side of said beam.

19. The article of claim 14 wherein said beam is made of a single sheet of high strength steel.

20. The article of claim 14 wherein said high strength steel is at least 80 KSI and a minimum of 0.060 inches thick.

21. An elongated impact beam for reinforcing a structural member and absorbing energy created by dynamic forces impacted on said structural member comprising:

said beam having two sides with a hat shaped portion extending between said sides and along at least a major portion of the length of said beam with a reversely bent portion extending laterally from and located on each side of said hat shaped portion;

said hat shaped portion having a top section located at one side of said beam and legs extending from said top section to the other side to form the hat shape, said legs diverging from each other;

said reversely bent portion including a section having a free edge which is located adjacent said legs of said hat shaped portion to stabilize and reinforce the same by opposing the spreading of said legs.

22. The beam of claim 21 in which said section of each of said reversely bent portions is directed toward the juncture between said reversely bent portion and said legs whereby a dynamic impact exerted on the one side of said beam is transferred to each of said sections causing them to exert a force on said legs to thereby oppose the spreading of said legs.

23. An elongated impact beam for reinforcing a structural member and absorbing energy created by dynamic forces impacting on said structural member comprising:

said beam having two sides with a hat shaped portion extending between said sides and along at least a major portion of the length of said beam with a reversely bent portion extending laterally from and located on each lateral side of said hat shaped portion;

said hat shaped portion having a top section located at one side of said beam and legs extending from said top section to the other side to form the hat shape;

said reversely bent portions each having a first section extending from one of said legs along said other side of said beam, and a second section extending from said first section toward said one side of said beam and then extending back at an angle toward and adjacent said other side of said beam so that the reversely bent portions extend toward and adjacent said other side, each of said second sections of each of said reversely bent portions extending substantially the entire distance from said other side of said beam to said one side so as to share in absorbing the dynamic forces imparted on the one side of said beam.

* * * * *